(12) United States Patent
Koclejda et al.

(10) Patent No.: US 6,726,736 B2
(45) Date of Patent: Apr. 27, 2004

(54) SYSTEM AND METHOD FOR REDUCING EMISSIONS FROM A DUST GENERATION STATION INCLUDING A METAL CUTTING STATION

(75) Inventors: Jean-Luc Koclejda, Monroe, OH (US); Michael Simek, Princeton, NJ (US)

(73) Assignee: International Mill Service, Inc., Horsham, PA (US)

(*) Notice: Subject to any disclaimer, the term of this patent is extended or adjusted under 35 U.S.C. 154(b) by 0 days.

(21) Appl. No.: 10/212,930

(22) Filed: Aug. 5, 2002

(65) Prior Publication Data

US 2004/0020364 A1 Feb. 5, 2004

(51) Int. Cl.[7] .............................................. B01D 46/00
(52) U.S. Cl. ...................... 55/385.2; 55/356; 55/385.1; 55/DIG. 18; 55/DIG. 46; 95/273; 15/347; 15/352; 366/22; 366/25; 366/40; 454/187
(58) Field of Search .............................. 55/356, 385.1, 55/385.2, DIG. 18, DIG. 46; 95/273; 15/347, 352; 366/22, 25, 40; 454/187

(56) References Cited

U.S. PATENT DOCUMENTS

| | | | |
|---|---|---|---|
| 3,870,489 A | | 3/1975 | Shaddock |
| 3,905,587 A | * | 9/1975 | Preeman ..................... 259/158 |
| 3,951,628 A | | 4/1976 | Eskijian |
| 3,973,935 A | | 8/1976 | Moore, Jr. et al. |
| 4,017,281 A | | 4/1977 | Johnstone |
| 4,136,964 A | * | 1/1979 | Swisher, Jr. ................. 366/23 |
| 4,190,370 A | * | 2/1980 | Brock et al. .................. 366/25 |
| 4,227,893 A | | 10/1980 | Shaddock |
| 4,574,420 A | | 3/1986 | Dupré |
| 4,715,720 A | * | 12/1987 | Brock .......................... 366/25 |
| 4,909,814 A | | 3/1990 | Sisk |
| 5,030,259 A | | 7/1991 | Bryant et al. |
| 5,141,528 A | | 8/1992 | Boczkiewicz et al. |
| 5,142,732 A | * | 9/1992 | Davis .......................... 15/352 |
| 5,218,737 A | | 6/1993 | Dansby et al. |
| 5,281,246 A | * | 1/1994 | Ray et al. ..................... 55/356 |
| 5,409,512 A | | 4/1995 | Wilkerson et al. |
| 5,634,712 A | * | 6/1997 | Musil .......................... 366/22 |
| 5,996,171 A | | 12/1999 | Bowers |
| 6,022,389 A | * | 2/2000 | Vross et al. .................. 55/356 |
| 6,221,135 B1 | * | 4/2001 | Wirth, Jr. et al. ............. 95/273 |
| 6,332,308 B1 | * | 12/2001 | Miller ................... 55/DIG. 18 |

* cited by examiner

Primary Examiner—Minh-Chau T. Pham
(74) Attorney, Agent, or Firm—RatnerPrestia (57) ABSTRACT

A system and method for reducing the emissions from a dust generation station, such as a metal cutting station, can be easily transported from location to location. The system uses a mobile carrier which supports a separator, such as a baghouse, as well as a telescopically adjustable duct. A hood, which is attached to the duct and serves to contain exhaust gases generated at the dust generating station, is capable of rotation about the hood pivot point. An exhaust fan serves to induce flow of the exhaust gas from the hood, through the duct and across the separator. A mobile, emission-free metal cutting system incorporates the system for reducing emissions as well as a mobile transport cutting machine.

31 Claims, 7 Drawing Sheets

SYSTEM AND METHOD FOR REDUCING EMISSIONS FROM A DUST GENERATION STATION INCLUDING A METAL CUTTING STATION

FIELD OF THE INVENTION

This invention relates generally to a reduced emission, dust management station. More specifically, the present invention relates to a mobile, reduced emission metal cutting station.

BACKGROUND OF THE INVENTION

Emissions, used herein to define particulates, dust, and granules, are generated during metal cutting, such as oxy-cutting, sandblasting, laser cutting, and the manufacture of asphalt, among others. Collectively, such activities are referred to herein as dust generating activities and the sites at which such dust is generated is referred to herein as dust generation stations. The emissions, which are often present within the exhaust gas generated at such dust generating stations have been treated in a variety of ways. In particular, systems designed to contain emissions generated from metal cutting processes, such as oxy-cutting, currently exist.

Nevertheless, the conventional systems available to date have several drawbacks. For example, the conventional systems that currently exist are not mobile but are typically installed as fixed structures at the site where the metal cutting or other dust generating processes occur. Moreover, these conventional systems are expensive and are designed to accommodate users with a large volume of product requiring processing such as metal cutting. Further, such systems are not designed to accommodate users who do not require a large volume of products to be metal-cut due to the expense of installing a fixed structure. Yet another drawback is that the conventional systems presently available are not versatile in that they typically only accommodate metal cutting of a single type of product.

SUMMARY OF THE INVENTION

In view of the shortcomings of the prior art, the present invention provides a mobile system for treating exhaust gas generated from a dust generating station, such as a metal cutting station. The system of present invention is a new emission-free, mobile metal cutting station that can be moved from location to location and takes into account variations in the type of products requiring metal cutting. The present invention can be quickly and easily assembled and disassembled and can be transported from location to location on regular roadways. The present invention accommodates the needs of those customers with a small volume of product requiring metal cutting or other dust management. The present invention also contemplates a method for treating exhaust gas generated from a dust generation station, as well as a mobile, reduced emission metal cutting system and related method.

According to an embodiment of the invention, the mobile system for treating exhaust gas includes a mobile carrier comprising a frame supported by wheels, and a separator for separating particulates from the exhaust gas generated from the dust generating station. The separator provides a substantially particulate-free gas stream and is mounted on the frame. A telescopically adjustable duct, is connected to the separator at its inlet and serves to convey the exhaust gas to the separator. The system also includes an adjustable exhaust hood for containing the exhaust gas generated from the dust generating station. The exhaust hood is connected to the duct through a flexible duct connection comprising a hood pivot point and is capable of rotation about the hood pivot point. An exhaust fan, or some other device, induces the exhaust gas to flow from the exhaust hood, through the duct, and through the separator.

According to the related method for treating exhaust gas generated from a dust generation station, the mobile system having aspects as those described above is transported to a location near a dust generation station. Then, the hood is positioned over the dust generating station to contain the exhaust gas by at least one of: (1) pivoting the duct about the inlet central axis, (2) longitudinally adjusting the length of the duct, (3) adjusting the height and angle of the duct and (4) rotating the exhaust hood about a hood pivot point. The exhaust gas is induced to flow from the exhaust hood, through the duct, and through the separator, and the particulates of the exhaust gas are separated in the separator. Medium leaving the separator is a substantially particulate-free gas stream.

According to another aspect of the invention, a mobile, reduced emission metal-cutting system includes, in addition to the system described above, a mobile cutting machine comprising: a cutting instrument, such as a plurality of torches; and a torch support that is mounted on a boom-end of the mobile transport cutting machine. A table or another apparatus provides a cutting surface for use in conjunction with the cutting instrument.

According to yet another embodiment of the invention, a method of cutting metal and reducing emissions therefrom comprises transporting, to a metal cutting site, a mobile cutting machine of the invention and transporting, to the metal cutting site, a mobile carrier having the separator, adjustable duct, and hood as described above. The method then involves positioning the metal cutting station so that the torch cutting machine is at a height and angle to enable metal cutting of the product. The method includes positioning the exhaust hood over the metal-cutting station to contain the exhaust gas by at least one of: (1) pivoting the duct about the inlet central axis, (2) longitudinally adjusting the length of the duct, (3) adjusting the height and angle of the duct and (4) rotating the exhaust hood about a hood pivot point. The method also includes inducing the exhaust gas to flow from the exhaust hood, through the duct, and through the separator.

These and other aspects of the invention are set forth below with reference to the drawings and the description of exemplary embodiments of the invention.

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawings are the following figures.

DETAILED DESCRIPTION OF THE INVENTION

Figure 1A:
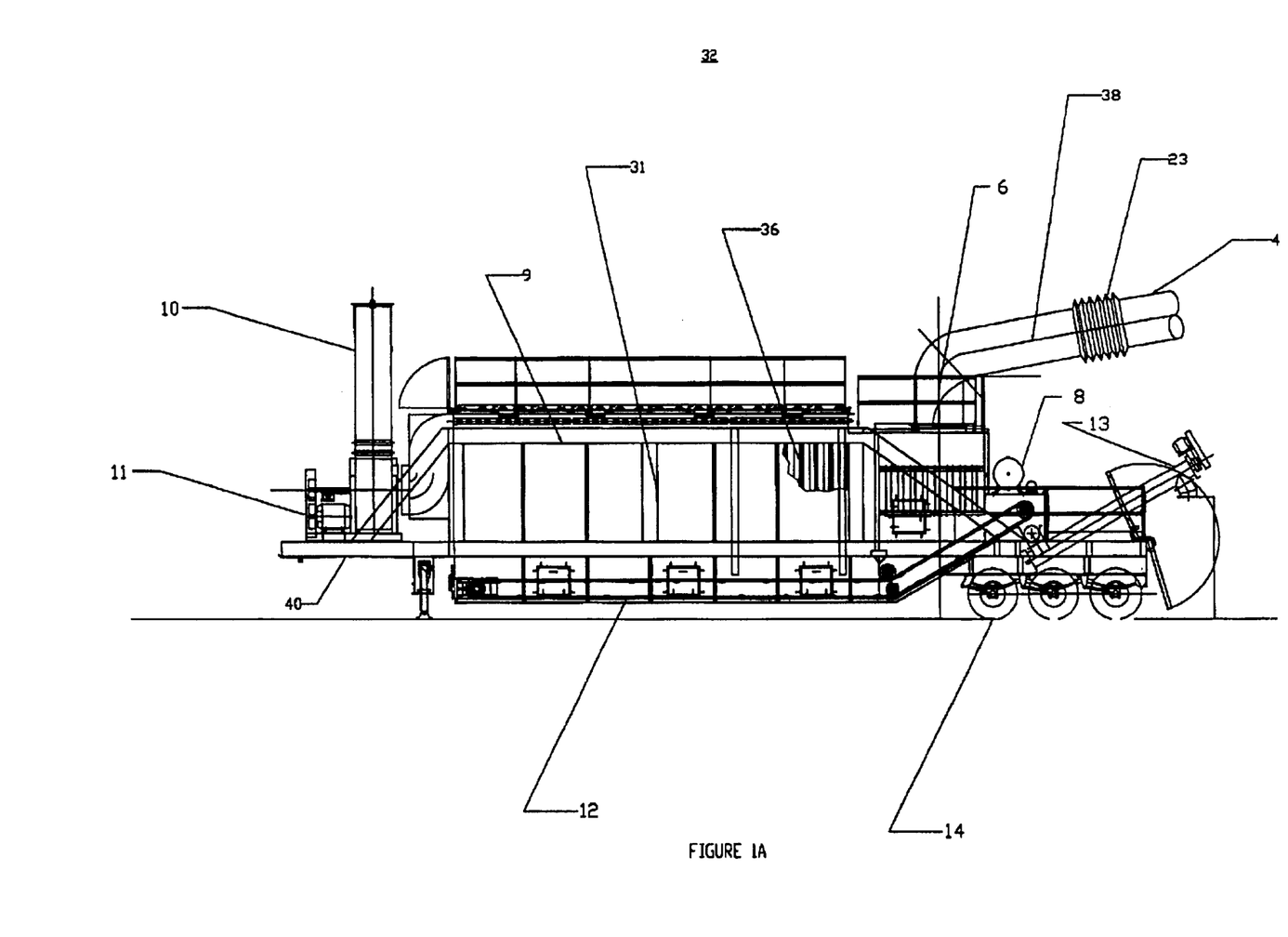
FIG. 1A is a side view, partially cut-away, of a portion of mobile system for treating exhaust gas according to the present invention.
Figure 1B:
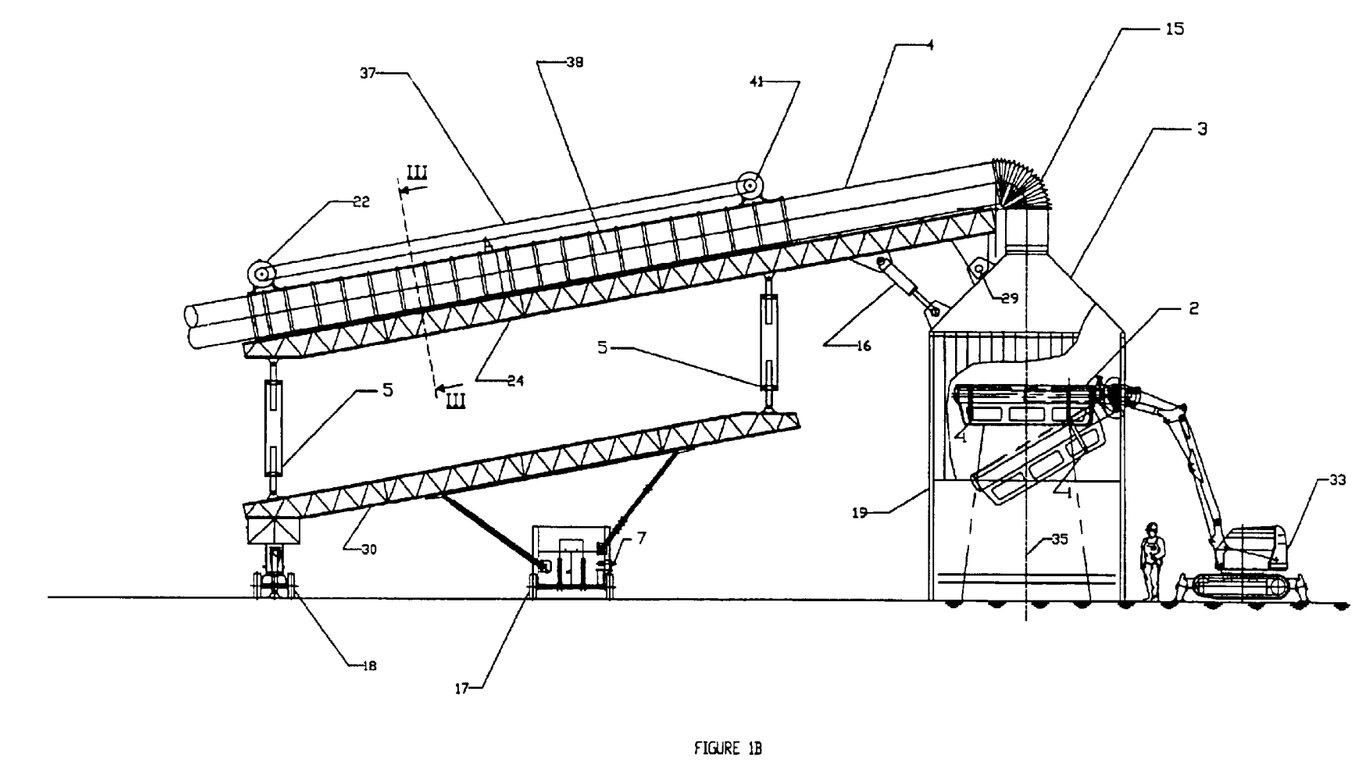
FIG. 1B is a side view, partially cut-away, of the remaining portion of the mobile system for treating exhaust gas and a mobile cutting machine according to the present invention.

A side view of an exemplary embodiment of the present invention is shown in FIGS. 1A and 1B. The system shown in FIG. 1A includes a mobile carrier 32, having a frame 40 and a plurality of mobile carrier trailer wheels 14 supporting the frame. The frame can be any suitable frame having the strength and rigidity to support the mobile system of the invention, and is generally in the shape and size of a conventional trailer suitable for being driven on a highway. Mounted on frame 40 of the mobile carrier is a separator 31, such as a baghouse, having a plurality of multiple separator compartments 9 and containing a plurality of filters 36. As will be explained below, separator 31 serves to separate particulates from the exhaust gas generated from a dust generating station to provide a substantially particulate-free gas stream. Separator 31 defines a dirty air inlet 6, shown more specifically in FIG. 2 and discussed below, and also has a removable top and or portions of its top, which are removable, primarily for cleaning and maintenance access. Inlet 6 serves to receive the exhaust gas from the dust generating station. Separator 31 also defines an outlet, at the end of a fan exhaust stack 10, for emitting the substantially particulate-free gas stream. Included on mobile carrier 32 also is a dust conveyor 12 which collects the dust falling from filters 36 and feeds it to a dump conveyor 13, where it is fed to a dumping area where it can be collected. An on board air compressor 8 is also mounted on the frame 40 of the mobile carrier 32 for providing pressurized air.

A telescopically adjustable duct 4 is connected to separator 31 at dirty air inlet 6. Duct 4 serves to convey the exhaust gas to the separator and has a flexible duct connection 23 near the dirty air inlet 6. Duct 4 is discussed in more detail in connection with FIGS. 3A, 3B, and 4. On the opposite end of duct 4, the duct is connected to an adjustable exhaust hood 3, having a hood central axis 35, which serves to contain the exhaust gas generated from the dust generating station. As described in more detail in connection with FIGS. 5A and 5B, exhaust hood 3 is connected to duct 4 through a flexible duct connection and is capable of rotation about the hood pivot point 29. An exhaust fan 11, mounted between exhaust stack 10 and the compartments of separator 31, serves to induce the exhaust gas to flow from exhaust hood 3, through duct 4, and across separator 31. A baghouse mounted on a mobile carrier having an exhaust fan, an exhaust stack, a dust conveyor and a dump conveyor is commercially available from C.P. Environmental, Inc.

As illustrated in FIG. 1B, exhaust hood 3 is connected to telescopically adjustable radial duct 4 by means of a flexible duct connection 15, which is a conventional accordion-style duct which allows bends in the duct and is often made of hard rubber.

Referring again to FIG. 1B, in the exemplary embodiment, exhaust hood 3 is connected to the telescopically adjustable radial duct 4 by means of flexible duct connection 15. As illustrated, exhaust hood 3 is also connected to upper duct frame 24 by a cylinder for hood adjustment 16. Flexible duct connection 15 and cylinder for hood adjustment 16 enable exhaust hood 3 to move about a hood pivot point 29 which allows for the proper angling of exhaust hood 3 so that the exhaust hood maintains a 90° angle with the ground. In another exemplary embodiment, exhaust hood 3 contains a set of adjustable hood curtains 19. In the preferred embodiment, hood curtains 19 contain cut-outs for maintaining the necessary air flow required to evacuate the exhaust gas. Also, hood curtains 19 should be adjusted in such a way as to allow for air at atmospheric pressure to be drawn in from all four sides of exhaust hood 3 upon actuation of exhaust fan 11.

As shown in FIG. 1B, multi-positional duct support frame consisting of an upper support duct frame 24 and a lower support duct frame 30, a frame support wheel 18; a pair of height adjustable devices 5, and a motor with set of controls 7 and a frame support drive wheel 17. During the assembly phase, proper positioning of duct 4 with respect to torch support 2 is accomplished by running the motor operated using controls 7. Controls 7 are used to move support drive wheel 17 which in turn causes upper support duct frame 24, lower support duct frame 30, and subsequently duct 4, to move frame support wheel 18 thereby allowing duct 4 and upper and lower duct support to frames 24 and 30 to pivot around the axis of dirty air inlet 6, so that duct 4 can be positioned at the correct angle between separator 31 and torch support 2. Next, exhaust hood 3 and the duct 4 are positioned above mobile transport cutting machine 33 by (1) longitudinally adjusting the telescopically adjustable radial duct 4; (2) rotating the exhaust hood 3 about the hood pivot point 29 (3) adjusting hood curtains 19 of the exhaust hood 3 so that the hood curtains allow proper air flow. As such, a tent-like enclosure is formed by exhaust hood 3 and adjustable hood curtains 19. In this manner, the tent-like enclosure captures all or substantially all of the exhaust gas generated from the metal cutting process. In the exemplary embodiment, duct 4 is longitudinally expandable by means of a winch 22 and take-off sheave 41, connected by a winch cable 37, in a known manner. In addition, hood curtains 19 of exhaust hood 3, are comprised of rigid, flame retardant material in a preferred embodiment.

Referring again to FIG. 1B, in the exemplary embodiment, height positioning of the upper and lower support frame 24 and 30 and subsequently duct 4, and exhaust hood 3 are performed by a pair of height adjustable devices 5, such as pneumatic pistons or cylinders, connected to upper duct support frame 24 and lower duct support frame 30. Proper positioning of the duct and exhaust hood 3 is necessary so that an enclosure tent is formed over the dust generating station whereby emissions are trapped. Height positioning of duct 4 and exhaust hood 3 is determined, in part, by the shape of the product requiring metal cutting. In an exemplary embodiment, the height and angular positioning of the duct 4 and exhaust hood 3 are controlled by an electrical drive unit, containing controls, mounted on control unit 7.

The system for metal cutting illustrated in FIG. 1B includes a mobile transport cutting machine 33 comprising a drive motor and an electrical drive unit (not shown), a cutting instrument 1, and a multidirectional torch support 2 mounted to the framework. In the exemplary embodiment, the multi-positional frame of the boom end of mobile transport cutting machine 33 is designed to rotate on its pivot point, which allows cutting instrument 1 to follow the top surface of the products requiring metal-cutting. Additionally, the multi-positional frame has a second pivot point that enables the frame to rotate clockwise and counter clockwise on the longitudinal axis of the boom-end of mobile transport cutting machine 33. Thus, the boom-end of the multi-positional frame of mobile transport cutting machine 33 is articulated on two axes, which allows for a variety height adjustments.

As shown in FIG. 1B, cutting instrument 1 and torch support 2 are installed on the boom-end of the multi-positional frame of mobile transport is cutting machine 33. Torch support 2 provides a carriage for cutting instrument 1 and is capable of multi-directional movement. As such, torch support 2 operates to position cutting instrument 1 along the vertical axis thereby positioning the cutting instrument at the correct height for optimal cutting. Additionally, torch support 2 provides for horizontal movement of cutting instrument 1 by moving the cutting instrument 1 perpendicular to the planes of two-axis horizontal movement over the product requiring metal cutting. Hydraulic motors power these rotational motions. Hydraulic pressure and flow for the hydraulic motors is supplied from a hydraulic unit (not shown) mounted on mobile transport cutting machine 33. An electrical drive unit mounted on mobile transport cutting machine 33 controls the vertical and horizontal movements of torch support 2 and the hydraulic motors.

In the exemplary embodiment, cutting instrument 1 comprises multiple torches. Each of the torches installed on the multi-positional frame of mobile transport cutting machine 33 is mounted on an independent travel system that is propelled by an independent electrical drive motor. Each electrical drive motor is powered by independent variable speed drive systems installed inside an electrical control panel mounted on mobile transport cutting machine 33. Note that the independent variable speed drive systems are controlled from the ground level by control unit 7.

The multiple torches of cutting instrument 1 use an oxygen and other gas type fuel mixture that is pre-mixed inside the cutting nozzles of the torches. The oxygen and other gas are supplied to the torches through hoses that are installed on the multi-positional frame of mobile transport cutting machine 33 through flexible hose trays (not shown). Multiple fluid regulating stations, including flexible hose trays (not shown), are installed on mobile transport cutting machine 33 to supply and regulate the appropriate fluid pressure and volume for each of the torches of cutting instrument 1. Each fluid regulating station is engineered to accommodate the need of each torch of cutting instrument 1 and is designed to follow the motion of both the multi-positional frame, as well as the articulated boom end of mobile transport cutting machine 33. In an exemplary embodiment, the multiple fluid regulating stations are controlled from the ground level by control unit 7 via a remote control device or hard connections such as an umbilical type electrical cord.

Referring again to FIG. 1B, in the exemplary embodiment, mobile transport cutting machine 33 is designed to independently follow the radial motion of duct 4 and exhaust hood 3 connected to mobile carrier 32 before or during the metal-cutting process.

In yet exemplary embodiment, mobile transport cutting machine 33 contains at least one cutting surface (not shown). Preferably, the cutting surface consists of several cutting tables engineered to accommodate the size, shape and weight of multiple products requiring metal cutting.

Figure 2:
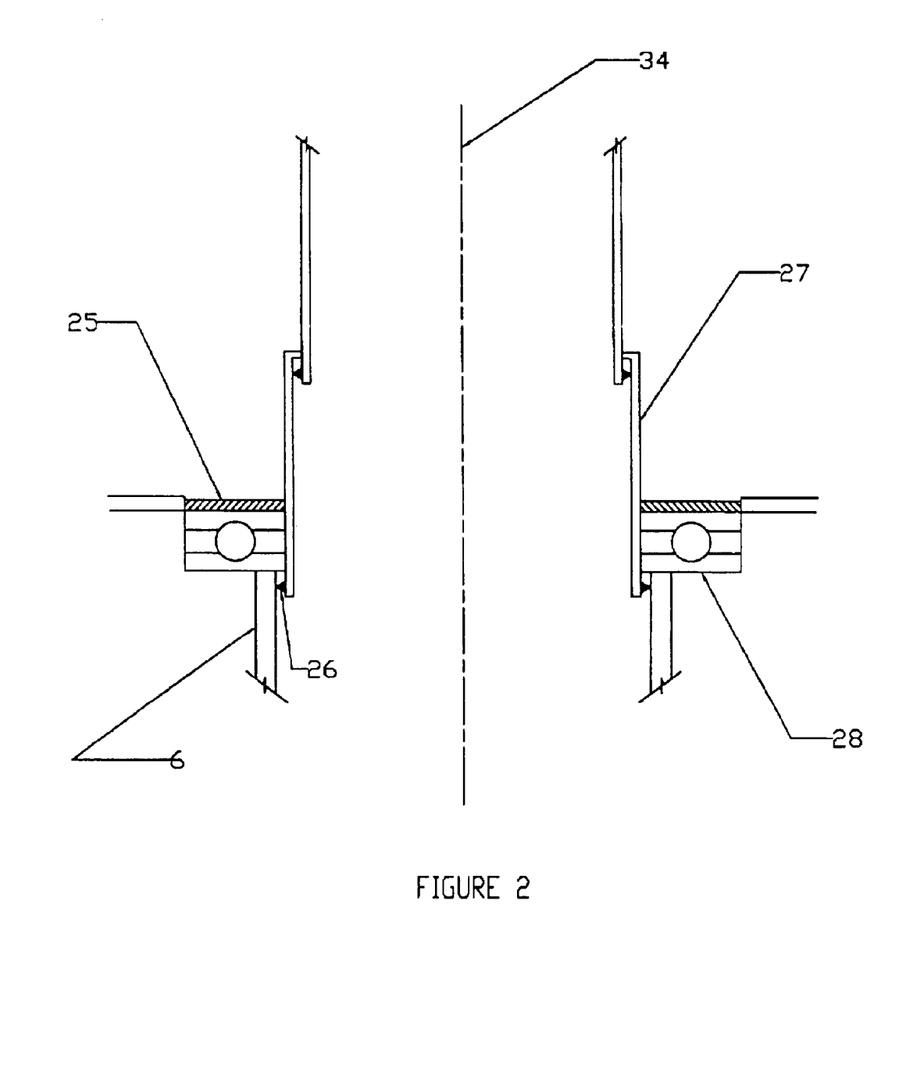
FIG. 2 is a longitudinal cross-sectional view of the dirty air inlet shown in FIG. 1A.

FIG. 2 is a longitudinal cross sectional view of the dirty air inlet. In FIG. 2, the general construction of dirty air inlet 6 is illustrated. To facilitate the positioning of duct 4 with respect to separator 31, an expandable dirty air inlet cylinder 27, containing a seal 26, such as an O-ring seal, moves vertically along a dirty air inlet central axis 34. As shown in FIG. 2, a ring 25 is situated on top a bearing 28, which allows for radial variations of the entire assembly. Specifically, the assembly allows duct 4 to rotate or pivot with respect to dirty air inlet 6 and move axially up and down with respect to dirty air inlet 6.

Figure 3A:
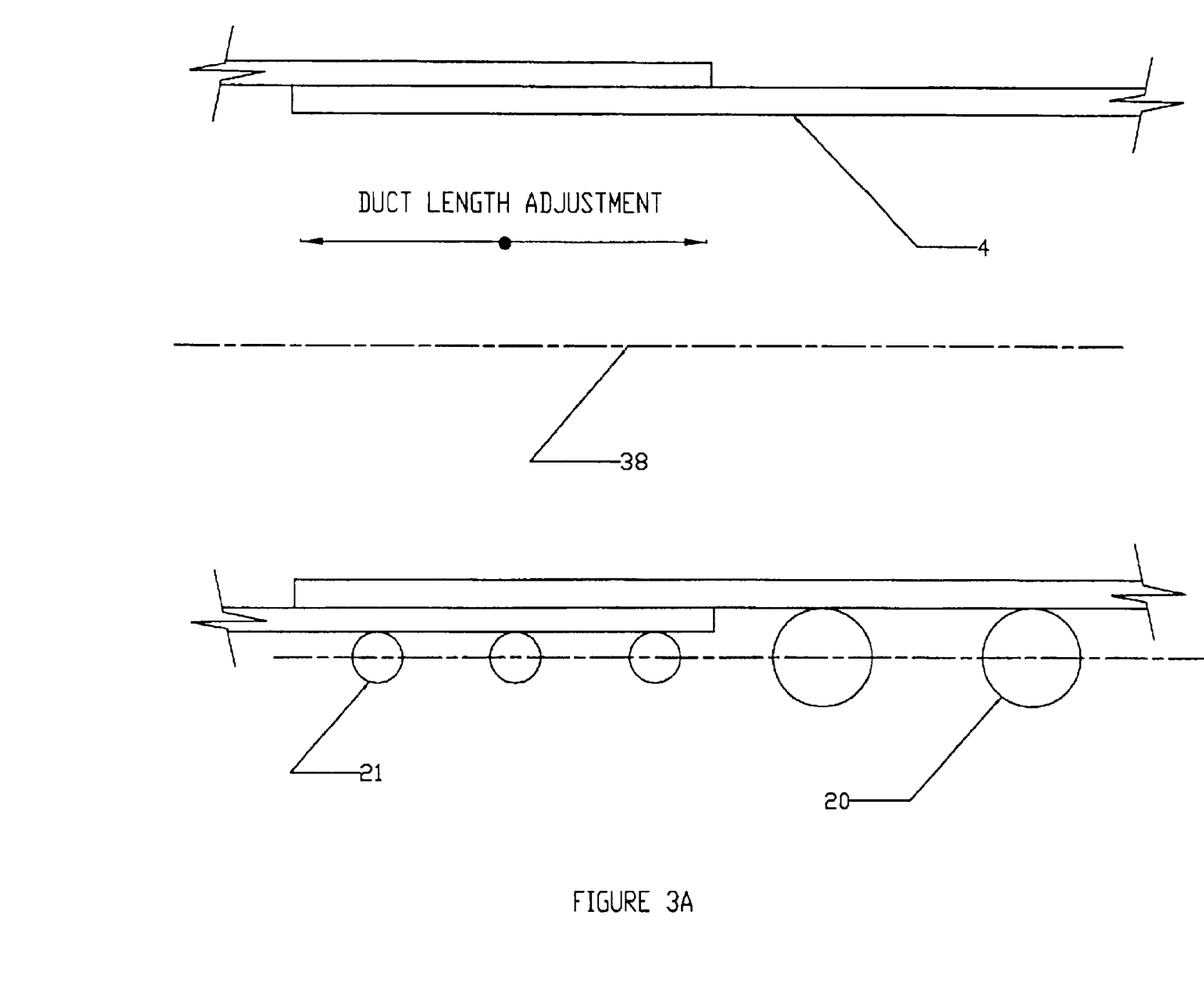
FIG. 3A is a longitudinal cross-sectional view of the duct illustrating adjustments in duct length.

FIG. 3A is a longitudinal view of the duct illustrating adjustments in duct length. As illustrated, duct 4 sits atop a plurality of rollers for duct adjustment 20 and 21. Essentially, duct 4 expands by sliding sections of the duct in upon itself. Specifically, rollers for duct adjustment 20 are present to facilitate a portion of duct 4 to slide inside another portion the duct, while rollers for duct adjustment 21 enable a portion of duct 4 to slide outside of the duct. Accordingly, adjustments in the length of duct 4 are possible.

Note that rollers for duct adjustment 20 and 21 are attached to upper duct support frame 24 ( shown in FIG. 3A). As such, rollers for duct adjustment 20 and 21 enable duct 4 to move along a duct central axis 38. Rollers for duct adjustment 20 and 21 also function to keep duct 4 from rubbing against upper duct support frame 24.

Figure 3B:
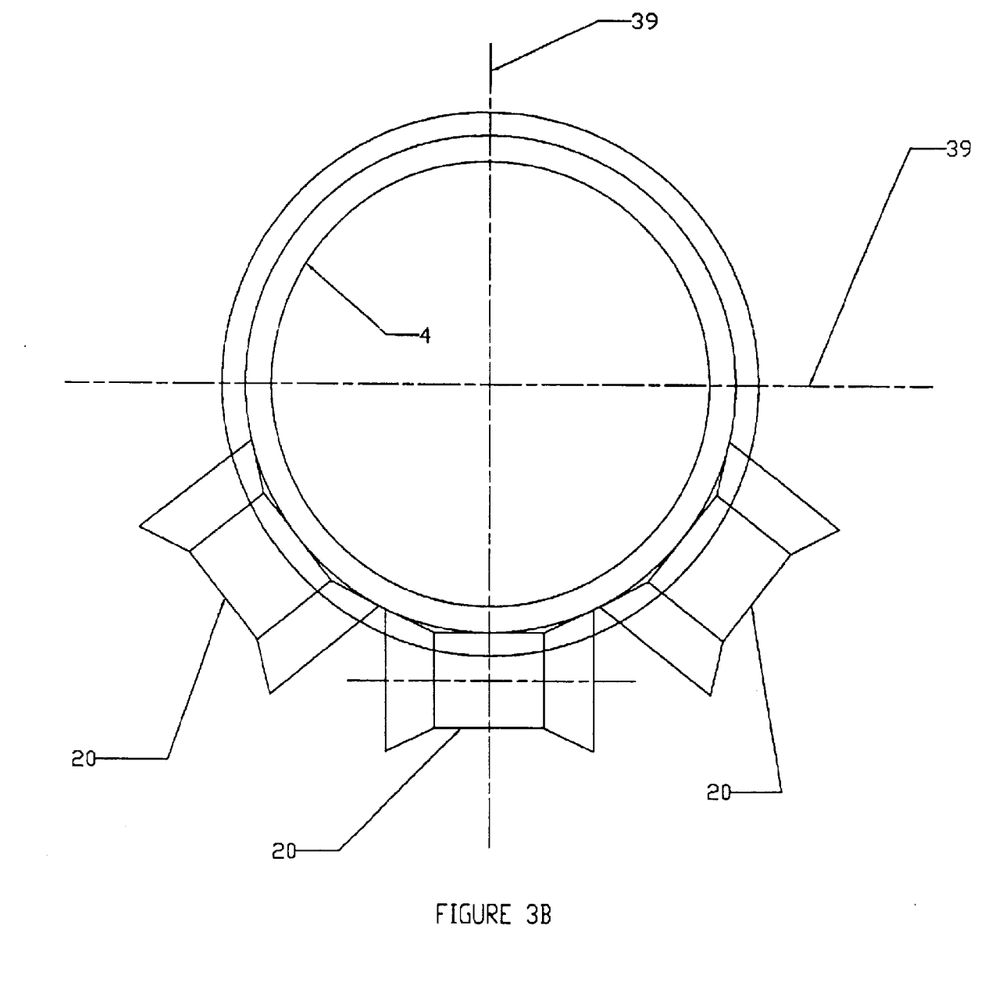
FIG. 3B is a radial cross-sectional view along the line III—III in FIG. 1B.

FIG. 3B is a detailed cross sectional view of the rollers for duct adjustment. FIG. 3B provides an additional view of the manner in which duct 4 sits on top of a plurality rollers for duct adjustment 20.

Figure 4:
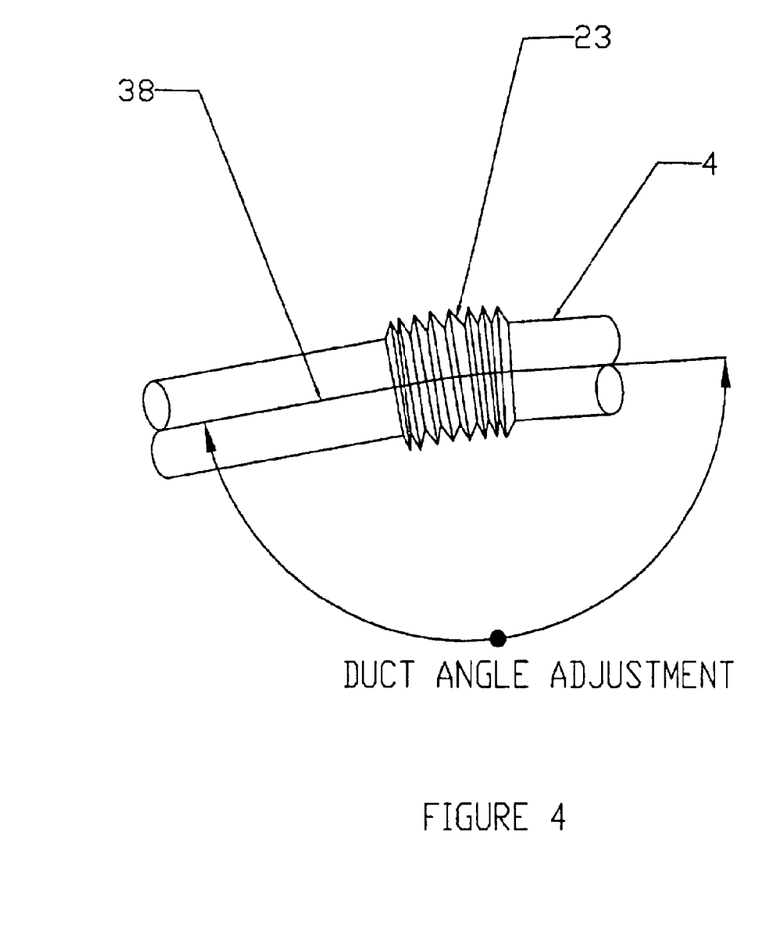
FIG. 4 illustrates the flexible duct connection near the dirty air inlet end of the duct.

FIG. 4 illustrates the flexible duct connection at the dirty air inlet end of the duct. As illustrated, a flexible duct connection at inlet end 23 consists of an accordion-like section of duct, which is situated in close proximity to dirty air inlet 6 (shown in FIG. 1A). FIG. 4 shows the manner in which duct angle adjustment is possible due to the presence of flexible duct connection at inlet end 23.

Figure 5A:
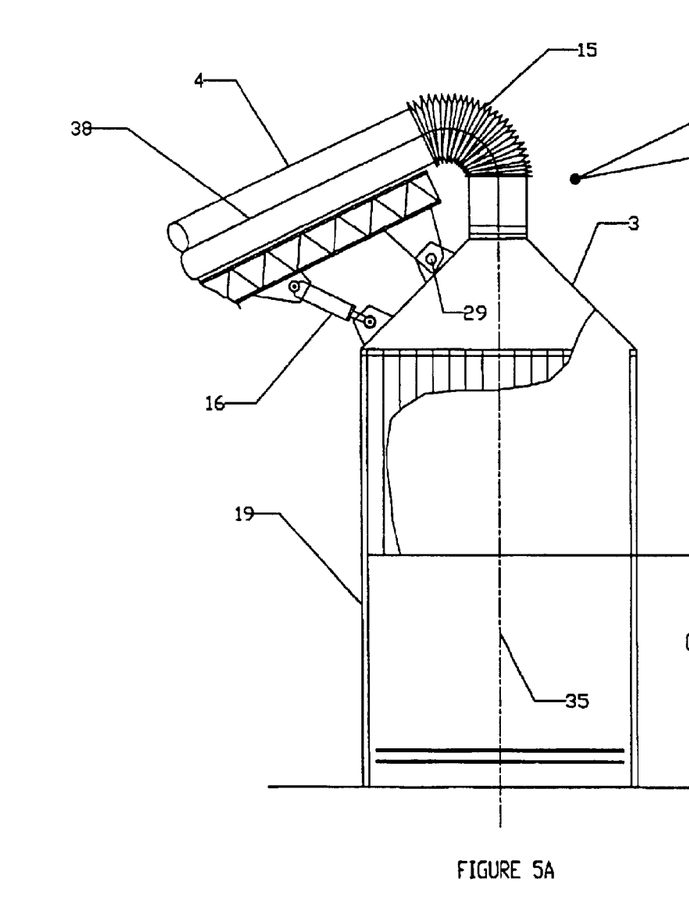
FIGS. 5A and 5B provide an enlarged side views, partially cut-away, of the exhaust hood and the flexible duct connection, showing the curtain lengths at different heights and different hood angles relative to the duct. The hood is always maintained perpendicular to the ground.
Figure 5B:
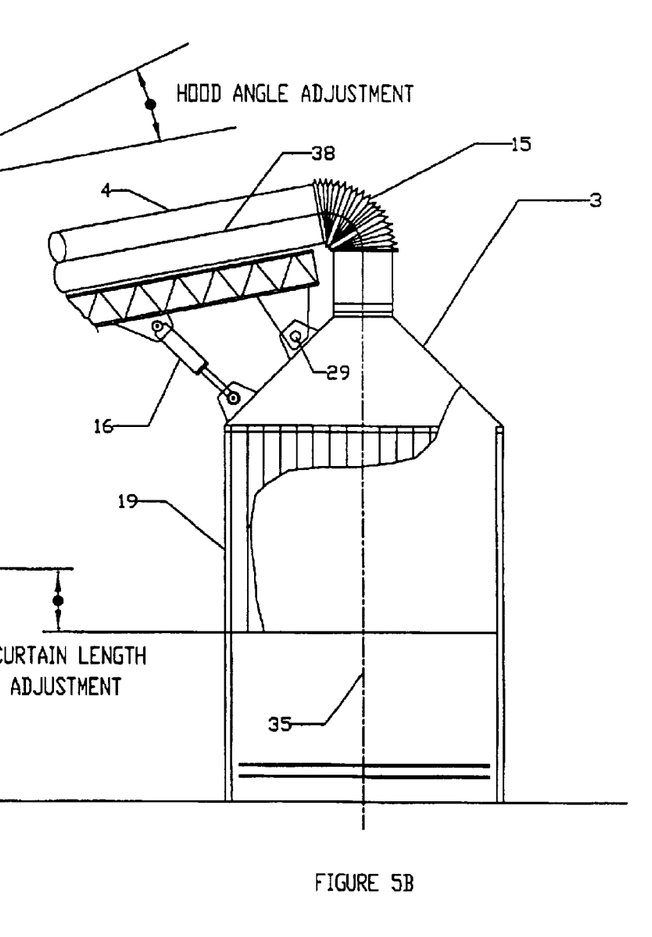

FIGS. 5A and 5B provide a longitudinal view of the exhaust hood and the flexible duct connection. As used herein, "flexible duct connection" shall mean any structure for connecting duct 4 to exhaust hood 3 in a way which allows for the gases to flow from the interior of hood 3 to duct 4 while permitting adjustments in the angle between the hood central axis and the duct central axis. As shown in FIGS. 5A and 5B, flexible duct connection includes flexible duct conduit 15, hood pivot point 29, and cylinder for hood adjustment 16. As depicted in FIGS. 5A and 5B, duct 4 is connected to exhaust hood 3 by means of a flexible duct conduit 15 consisting of an accordion-type piece of duct and cylinder for hood adjustment 16, which allow for hood angle adjustments about hood pivot point 29. As seen in FIGS. 5A and 5B, cylinder for hood adjustment 16 is situated between exhaust hood 3 and upper duct support frame 24. Note that, flexible duct conduit 15 and cylinder for hood adjustment 16 enable exhaust hood 3 to move about a hood pivot point 29 thereby allowing the exhaust hood to maintain a 9° angle with the ground, even after an angle adjustment of connecting duct 4.

FIGS. 5A and 5B also provide an illustration of exhaust hood 3 having a variety of hood curtain 19 lengths extending from the bottom of the hood to the ground. A variety of hood curtain 19 lengths enable a tent-like enclosure to be formed around mobile transport cutting machine 33 (shown in FIG. 1B) which facilitates emission free metal cutting.

The metal-cutting process generates exhaust gas, containing particulates, such as dust and fumes, from the reaction of the flame of the fuel mixture of cutting instrument 1 and the material of the product to be cut. Thus, the method of the present invention calls for first transporting a mobile system for use with a dust generating station to a location near a metal cutting station. As discussed above, such a system comprises: (1) a mobile carrier; (2) a separator mounted on the mobile carrier and having an inlet with an inlet central axis; (3) an adjustable duct, having a duct central axis, connected to the separator at the inlet for conveying the exhaust gas to the separator; and (4) an adjustable exhaust hood, having a hood central axis, connected to the duct for containing the exhaust gas generated from the dust generating station. Then, the system causes the hood to be positioned over the dust generating station to contain the exhaust gas by at least one of: (1) pivoting the duct radially about the inlet central axis, (2) longitudinally adjusting the length of the duct, (3) adjusting the height and angle of the duct and (4) rotating the exhaust hood about the hood pivot point 29. Depending on the spatial orientation of separator 31 with respect to multidirectional torch support 2, any one of these adjustments, any combination, or all four of these adjustments can be effected.

Once exhaust hood 3 and telescopically adjustable radial duct 4 are properly positioned above cutting instrument 1, so that a tent-like enclosure is formed, a high volume exhaust fan 11, mounted on mobile carrier 32 creates a vacuum which causes a particulate laden stream of exhaust gas generated from cutting instrument 1 to be drawn into the exhaust hood, through the duct, through dirty air inlet 6, and into separator 19. As illustrated in FIG. 1A, separator 19 is mounted on the frame of mobile carrier 32 and consists of a conventional baghouse containing multiple compartments 9 with separator filters 36. Additionally, in the preferred embodiment, separator 31 has a removable top that facilitates removal, maintenance, and cleaning.

As exhaust gas is drawn through separator compartments 9, particulates present in the exhaust gas will be trapped throughout separator filters 36 of separator 31 so that a substantially particulate-free gas steam will be emitted from an outlet such as a fan exhaust stack 10. Due to the effect of reverse airflow pulses, the particulates will drop onto a dust conveyor 12 which will move the particulates onto a dump conveyor 13 which will then deposit the particulates into a debris container (not shown) located beneath mobile carrier 32. In one exemplary embodiment, dump conveyor 13 is a screw conveyor.

In yet another exemplary embodiment, the debris container will be a fully closed container so that the collected particulate matter does not go back into the environment. Ideally, the debris container should be of a type, which can be manually opened, so that the container can be emptied regularly.

The mobile metal cutting and dust management station can be easily assembled and disassembled for transportation from location to location. For example mobile transport cutting machine 33 can be disassembled and placed on a flatbed truck along with radial controls 7. Duct 4 can be disengaged from separator 31 at dirty air inlet 6 and placed on a flat bed truck along with upper support frame 24, lower support frame 30 and exhaust hood 3. The remainder of mobile carrier 32 (i.e., separator 31, exhaust fan 11, fan exhaust stack 10, dust conveyor 12 dump conveyor 13) can be hooked to a truck for transportation purposes.

A mobile metal-cutting and dust management station is thus provided that can be moved from location to location and which allows for on-site emission free metal-cutting of multiple types of products. Additionally, the present invention can accommodate the needs of those customers with a small volume of product requiring metal-cutting.

Although the invention is illustrated and described herein with reference to specific embodiments, the invention is not intended to be limited to the details shown. Rather, various modifications may be made in the details within the scope and range of equivalents of the claims and without departing from the invention. For example, while the preferred embodiment of the invention is a mobile emission-free metal cutting station, aspects of the invention are not intended to be limited to metal cutting; the system and method for treating exhaust gas can be used for any dust generating process, such as sandblasting, the manufacture of asphalt, etc.

What is claimed:

1. A mobile system for treating exhaust gas generated from a dust generating station, the system comprising:

a mobile carrier comprising a frame supported by wheels;

a separator for separating particulates from the exhaust gas generated from the dust generating station to provide a substantially particulate-free gas stream, wherein the separator is mounted on the frame, has an inlet for receiving the exhaust gas from the dust generating station, and an outlet for emitting the substantially particulate-free gas stream;

a telescopically adjustable duct connected to the separator at the inlet for conveying the exhaust gas to the separator;

an adjustable exhaust hood, connected to the duct through a flexible hood connection, for containing the exhaust gas generated from the dust generating station, wherein the exhaust hood is capable of rotation about a hood pivot point, and means for inducing the exhaust gas to flow from the exhaust hood, through the duct, and through the separator.

2. The system according to claim 1, wherein the separator comprises a removable top and a plurality of compartments having filters.

3. The system according to claim 1, wherein the separator is a baghouse.

4. The system according to claim 1, wherein the dust generating station is a metal cutting station generating the exhaust gas.

5. The system according to claim 1, wherein the exhaust hood has adjustable hood curtains for providing different heights.

6. The system according to claim 1, wherein the exhaust hood comprises a top member in the shape of an inverted truncated cone attached to the duct and flame retardant, rigid curtains extending vertically from the top member towards the ground.

7. The system according to claim 1, wherein the flexible hood connection further comprises a flexible conduit connecting the telescopically adjustable duct and the exhaust hood.

8. The system according to claim 7, wherein the flexible conduit is an accordion connection which allows for rotation of the exhaust hood about the hood pivot point.

9. The system according to claim 1 further comprising a duct support frame for supporting the duct.

10. The system according to claim 9, wherein the duct support frame comprises an upper duct support frame on which the duct rests, a lower duct support frame having a wheel, a stabilizing device extending between the ground and the lower duct support frame, and a first height adjustable device and a second height adjustable device extending between the lower duct support frame and the upper duct support frame, wherein the first and the second height adjustable devices provide for different height positions.

11. The system according to claim 10 further comprising an electrical drive unit for controlling the rotational positioning of the hood and the height adjustments of the upper duct support frame.

12. The system according to claim 1 further comprising an on-board air compressor mounted on the frame of the mobile carrier for providing pressurized air.

13. The system according to claim 1, wherein the means for inducing the exhaust gas to flow comprise a high volume exhaust fan located on the mobile carrier.

14. The system according to claim 1, wherein the duct is connected to the separator at the inlet, wherein the inlet is adapted to allow for different height and angular positions of the duct.

15. The system according to claim 1 further comprising a winch mounted on said duct, a winch cable extending between said winch and said take-off sheave, and a plurality of rollers mounted on an upper duct support frame which enables different adjustments in the length of the duct.

16. The system according to claim 1, wherein the system is used to treat dust and exhaust gas generated from sandblasting.

17. The system according to claim 1, wherein the system is used to treat dust and exhaust gas generated from the manufacture of asphalt.

18. The system according to claim 1, wherein the system is used to treat dust and exhaust gas generated from metal cutting.

19. The system according to claim 1, wherein the flexible duct connection further comprises a flexible conduit connecting the telescopically adjustable duct and the exhaust hood and the system further comprises a duct support frame for supporting the duct and a cylinder for hood adjustment extending between the duct support frame and the duct, wherein the duct is mounted to the duct support frame at a position between the flexible conduit and the cylinder for hood adjustment.

20. A method for treating exhaust gas generated from a dust generating station, the method comprising the steps of:
    transporting a mobile system to a location near a dust generating site, wherein said system comprises: (1) a mobile carrier; (2) a separator mounted on the mobile carrier and having an inlet with an inlet central axis; (3) an adjustable duct connected to the separator at the inlet for conveying the exhaust gas to the separator; and (4) an adjustable exhaust hood, connected to the duct through a flexible hood connection comprising a hood pivot point for containing the exhaust gas generated from the dust generating station;
    positioning the hood over the dust generating station to contain the exhaust gas by at least one of: (1) pivoting the duct radially about the inlet central axis, (2) longitudinally adjusting the length of the duct, (3) adjusting the height and angle of the duct and (4) rotating the exhaust hood about the hood pivot point, and
    inducing the exhaust gas to flow from the exhaust hood, through the duct, and through the separator, wherein the particulates of the exhaust gas are separated in the separator to provide a substantially particulate-free gas stream.

21. The method according to claim 20 further comprising the steps of:
    trapping the particulates in a plurality of filters of the separator,
    using reverse airflow pulses to drop the particulates onto a duct conveyor,
    depositing the particulates onto a dump conveyor connected the dust conveyor, and
    depositing the particulates into a debris container located beneath the mobile carrier.

22. A mobile emission-free metal-cutting system comprising:
    a torch cutting machine designed to run on tracks or wheels comprising: (1) a cutting instrument, and (2) a multidirectional torch support for positioning of the cutting instrument;
    means for providing a cutting surface for use with the torch cutting machine,
    a mobile carrier comprising a frame supported by wheels;
    a separator for separating particulates from the exhaust gas generated from the metal-cutting station to provide a substantially particulate-free gas stream, wherein the separator is mounted on the frame, has an inlet for receiving the exhaust gas from the metal-cutting station, and an outlet for emitting the substantially particulate-free gas stream;
    a telescopically adjustable duct, connected to the separator at the inlet for conveying the exhaust gas to the separator;
    an adjustable exhaust hood, for containing the exhaust gas generated from the metal cutting station, wherein the exhaust hood is connected to the duct through a flexible hood connection comprising a hood pivot point and is capable of rotation about the hood pivot point; and
    means for inducing the exhaust gas to flow from the exhaust hood, through the duct, and through the separator.

23. The system according to claim 22, wherein the torch support is capable of multidirectional movement for different height and angular adjustments and is mounted on a boom-end of the mobile transporter.

24. The system according to claim 22, wherein the torch cutting machine comprises a multi-positional framework having a first pivot point that enables the cutting instrument to follow the top surface of the products to be processed during the metal-cutting process and a second pivot point that allows the framework to be capable of rotation about the longitudinal axis of the boom-end of the mobile transporter.

25. The system according to claim 22, wherein the cutting instrument comprises a plurality torches and each of the torches is mounted on an independent travel system individually propelled by independent electrical drive motors installed on each travel system.

26. The system according to claim 22, wherein each of the multiple torches uses an oxygen and other gas type fuel mixture supplied to the torches through hoses installed on the mobile transporter.

27. The system according to claim 22, wherein the mobile transporter has a plurality of fluid regulating stations to supply fluid pressure and volume to the cutting instrument.

28. The system according to claim 22, wherein the mobile transporter is self-powered.

29. The system according to claim 22, further comprising an electrical drive unit for controlling the torch cutting machine and the fluid regulating stations.

30. The system according to claim 22, wherein the means for providing a cutting surface comprise at least one table.

31. A method of cutting metal and reducing emissions therefrom, the method comprising the steps of:
    transporting, to a metal cutting site, a mobile transport cutting machine having a boom end comprising: (1) a cutting instrument mounted on the multidirectional torch support, and (2) a multidirectional torch support mounted on the boom-end of the mobile transport cutting machine for positioning the cutting instrument;
    transporting to the metal cutting site, a mobile carrier comprising (1) a separator mounted on the mobile carrier; (2) an adjustable duct, connected to the separator for conveying the exhaust gas to the separator; (3) a duct support frame, and (4) an adjustable exhaust hood, connected to the duct through a flexible hood connection comprising a hood pivot point for containing the exhaust gas generated from the metal-cutting station;

positioning the metal cutting station so that the cutting instrument 1 is at a height and angle to enable metal cutting of the product;

positioning the exhaust hood over the metal-cutting station to contain the exhaust gas by at least one of: (1) pivoting the duct about the inlet central axis, (2) longitudinally adjusting the length of the duct, (3) adjusting the height and angle of the duct and (4) rotating the exhaust hood about the hood pivot point; and inducing the exhaust gas to flow from the exhaust hood, through the duct, and through the separator.

* * * * *

UNITED STATES PATENT AND TRADEMARK OFFICE
CERTIFICATE OF CORRECTION

PATENT NO. : 6,726,736 B2
DATED : April 27, 2004
INVENTOR(S) : Koclejda et al.

It is certified that error appears in the above-identified patent and that said Letters Patent is hereby corrected as shown below:

Column 5,
Line 8, after "variety", insert -- of --.

Column 6,
Line 54, delete "9°" and insert therefor -- 90° --.

Column 7,
Line 28, delete "19" (two occurrences) and insert therefor -- 31 --.
Line 30, after "multiple", insert -- separator --.
Line 60, after "12", insert -- , --.

Signed and Sealed this

Twenty-third Day of November, 2004

JON W. DUDAS
*Director of the United States Patent and Trademark Office*